US012548165B2

(12) United States Patent
El-Khamy et al.

(10) Patent No.: US 12,548,165 B2
(45) Date of Patent: Feb. 10, 2026

(54) TEMPORAL SEMANTIC BOUNDARY LOSS FOR VIDEO SEMANTIC SEGMENTATION NETWORKS

(71) Applicant: Samsung Electronics Co., Ltd., Gyeonggi-do (KR)

(72) Inventors: Mostafa El-Khamy, San Diego, CA (US); Hai Su, San Diego, CA (US); Qingfeng Liu, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 405 days.

(21) Appl. No.: 18/107,173

(22) Filed: Feb. 8, 2023

(65) Prior Publication Data

US 2024/0177318 A1 May 30, 2024

Related U.S. Application Data

(60) Provisional application No. 63/428,618, filed on Nov. 29, 2022.

(51) Int. Cl.
*G06T 7/12* (2017.01)

(52) U.S. Cl.
CPC ...... *G06T 7/12* (2017.01); *G06T 2207/10016* (2013.01); *G06T 2207/20081* (2013.01)

(58) Field of Classification Search
None
See application file for complete search history.

(56) References Cited

U.S. PATENT DOCUMENTS

| 10,402,690 | B2 | 9/2019 | Vernaza et al. |
| 10,410,353 | B2 | 9/2019 | Feng et al. |
| 11,170,470 | B1 | 11/2021 | He et al. |
| 11,244,460 | B2 | 2/2022 | Price et al. |
| 12,286,115 | B2 * | 4/2025 | Pham ................. G06V 20/647 |
| 12,288,281 | B2 * | 4/2025 | Schroers ................. G06T 13/00 |
| 2020/0302612 | A1 | 9/2020 | Marrero et al. |
| 2022/0156971 | A1 * | 5/2022 | Guizilini ................. G06T 7/74 |
| 2022/0383510 | A1 * | 12/2022 | Varghese ................. G06T 7/11 |
| 2023/0010230 | A1 * | 1/2023 | Rhodes ................. G06V 20/70 |

(Continued)

FOREIGN PATENT DOCUMENTS

| CN | 112950645 | 6/2021 |
| WO | WO-2022182421 A1 * | 9/2022 ............... G06N 3/08 |

OTHER PUBLICATIONS

Nilsson, David et al., "Semantic Video Segmentation by Gated Recurrent Flow Propagation", Proceedings of the IEEE conference on computer vision and pattern recognition, pp. 6819-6828. 2018.

(Continued)

*Primary Examiner* — Randolph I Chu
(74) *Attorney, Agent, or Firm* — The Farrell Law Firm, P.C.

(57) ABSTRACT

Disclosed is a method including receiving, in a semantic segmentation network, input data from a plurality of frames, computing a ground truth label on the plurality of frames, generating a ground truth temporal semantic boundary map from the ground truth label on the plurality of frames, generating a predicted temporal semantic boundary map based on an output of the input data, and determining a loss based on the ground truth temporal semantic boundary map and the predicted temporal semantic boundary map.

19 Claims, 10 Drawing Sheets

(56) References Cited

U.S. PATENT DOCUMENTS

| | | | |
|---|---|---|---|
| 2023/0177810 A1* | 6/2023 | Xu ...................... | G06V 10/774 |
| | | | 382/159 |
| 2023/0196122 A1* | 6/2023 | Suh ......................... | G06N 5/01 |
| | | | 706/15 |
| 2023/0386222 A1* | 11/2023 | Lee ...................... | G06V 20/647 |
| 2024/0177318 A1* | 5/2024 | El-Khamy ............... | G06T 7/12 |
| 2025/0086760 A1* | 3/2025 | Kanazawa ................ | G06T 5/77 |
| 2025/0139783 A1* | 5/2025 | Marrero ............... | G06V 10/764 |
| 2025/0148777 A1* | 5/2025 | Tsai ..................... | G06V 10/774 |
| 2025/0209771 A1* | 6/2025 | Lee ..................... | G06V 10/761 |

OTHER PUBLICATIONS

Liu, Yifan et al., "Efficient Semantic Video Segmentation with Per-frame Inference", European Conference on Computer Vision, pp. 352-368. Springer, Cham, 2020.

* cited by examiner

TEMPORAL SEMANTIC BOUNDARY LOSS FOR VIDEO SEMANTIC SEGMENTATION NETWORKS

CROSS-REFERENCE TO RELATED APPLICATIONS

This application claims the priority benefit under 35 U.S.C. § 119(e) of U.S. Provisional Application No. 63/428,618, filed on Nov. 29, 2022, the disclosure of which is incorporated by reference in its entirety as if fully set forth herein.

TECHNICAL FIELD

The disclosure generally relates to video networks. More particularly, the subject matter disclosed herein relates to improvements to temporal consistency loss based on flow estimation in such video networks.

SUMMARY

Video semantic segmentation is a fundamental task in many downstream video computer vision tasks. Deep neural network based video semantic segmentation is a dense prediction network that aims to classify each pixel in the input video frame into its corresponding predefined categories. For some tasks such as content-aware image signal processing (ISP) and autonomous driving, it is critical to have temporal consistency and accuracy in semantic boundary regions. However, due to the dynamics of the content from frame to frame, it is challenging for the deep neural network to make consistent and correct predictions for the pixels near the boundary regions, resulting in flickering segmentation output around the boundary regions.

To solve this problem, a common practice in the prior art has been to introduce a temporal consistency (TC) loss based on optical flow estimation. The TC loss is an L1 loss between the logit at the current frame and a warped version of the logit of the previous frame. This strategy tends to improve temporal consistency but requires optical flow estimation that introduces additional errors. Specifically, optical flow methods inherently have an occlusion problem whereby the occlusion regions are disregarded in TC loss although occlusion mostly occurs along the semantic boundaries.

Optical flow estimation methods usually lack robustness to large displacement. That is, the optical flow estimation methods are unreliable and undermine the effectiveness of the TC loss when there is large displacement. It is difficult for the regularly trained semantic segmentation networks to make smooth and consistent predictions for consecutive frames, resulting in inconsistent predictions that cause flickering in the segmentation result. Such flickering tends to appear in the downstream tasks, such as ISP functions for an ISP pipeline.

Training with TC loss also requires an inference step of the optical flow network and a warping operation, both of which are computationally intensive and therefore compromise the training speed and memory consumption for training.

To overcome these issues, systems and methods are described herein for a novel temporal semantic boundary loss. This approach improves on previous methods because it does not rely on optical flow or motion estimation, and therefore, does not suffer from the above-described training speed, inconsistency, and memory drawbacks of the prior art. By eliminating reliance on motion estimation or optical flow, the temporal semantic boundary loss disclosed herein requires fewer computational resources during training than the prior art and decreases complexity of the prior art method at the inference stage. The approach herein can be plugged into any video semantic segmentation network, including video semantic segmentation methods that are based on recurrent networks. This provides enhanced speed, flexibility and convenience to the video semantic segmentation.

In an embodiment, a method includes receiving, in a semantic segmentation network, input data from a plurality of frames, computing a ground truth label on the plurality of frames, generating a ground truth temporal semantic boundary map from the ground truth label on the plurality of frames, generating a predicted temporal semantic boundary map based on an output of the input data, and determining a loss based on the ground truth temporal semantic boundary map and the predicted temporal semantic boundary map.

In an embodiment, a system includes a processor configured to receive, in a semantic segmentation network, input data from a plurality of frames, compute a ground truth label on the plurality of frames, generate a ground truth temporal semantic boundary map from the ground truth label on the plurality of frames, generate a predicted temporal semantic boundary map based on an output of the input data, and determine a loss based on the ground truth temporal semantic boundary map and the predicted temporal semantic boundary map.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments.

Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "predetermined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The methods described herein may be performed by various devices, such as a graphics processing unit (GPU) or a central processing unit (CPU) of any suitable device and may be run on a processor of a mobile device or any other suitable device. Such application is based on how the hardware and software guide optimizes the disclosed method. The disclosed method may be divided to run in different components, such that part may be run on the GPU or the CPU and another part may be run on a microprocessing unit (MPU) or a digital signal processor (DSP) or a neural processing unit (NPU), as examples. This provides the user with a heterogeneous computational platform for optimized usage.

Video semantic segmentation is the task of predicting the class of each pixel in each frame of an input video. This disclosure is a novel temporal semantic boundary loss for video semantic segmentation system that improves the temporal consistency and prediction accuracy around boundary regions. Specifically, the T-SBL includes an L1 loss between the temporal semantic boundaries in network outputs of two consecutive frames and those in ground truth labels. Ground truth temporal semantic boundaries can be computed from ground truth labels and predicted temporal semantic boundaries are computed from network predictions. The L1 loss requires the predicted temporal semantic boundary to match the ground truth temporal semantic boundary. This loss can improve the temporal consistency and segmentation accuracy with no cost of computation at an inference stage.

The disclosure does not rely on motion estimation or optical flow which introduce additional errors to the system. These errors undermine the training of the model. By negating reliance on motion estimation, the disclosed method requires fewer computation resources during training and decreases complexity at the inference stage.

The disclosure provides a novel temporal consistency loss that improves both mean temporal consistency (mTC) and mean intersection over union (mIoU). The T-SBL herein introduces negligible computational requirements to the training process compared to the conventional motion guided TC loss.

The disclosure also improves both the static semantic segmentation networks and recurrent framework based semantic segmentation networks.

Figure 1:
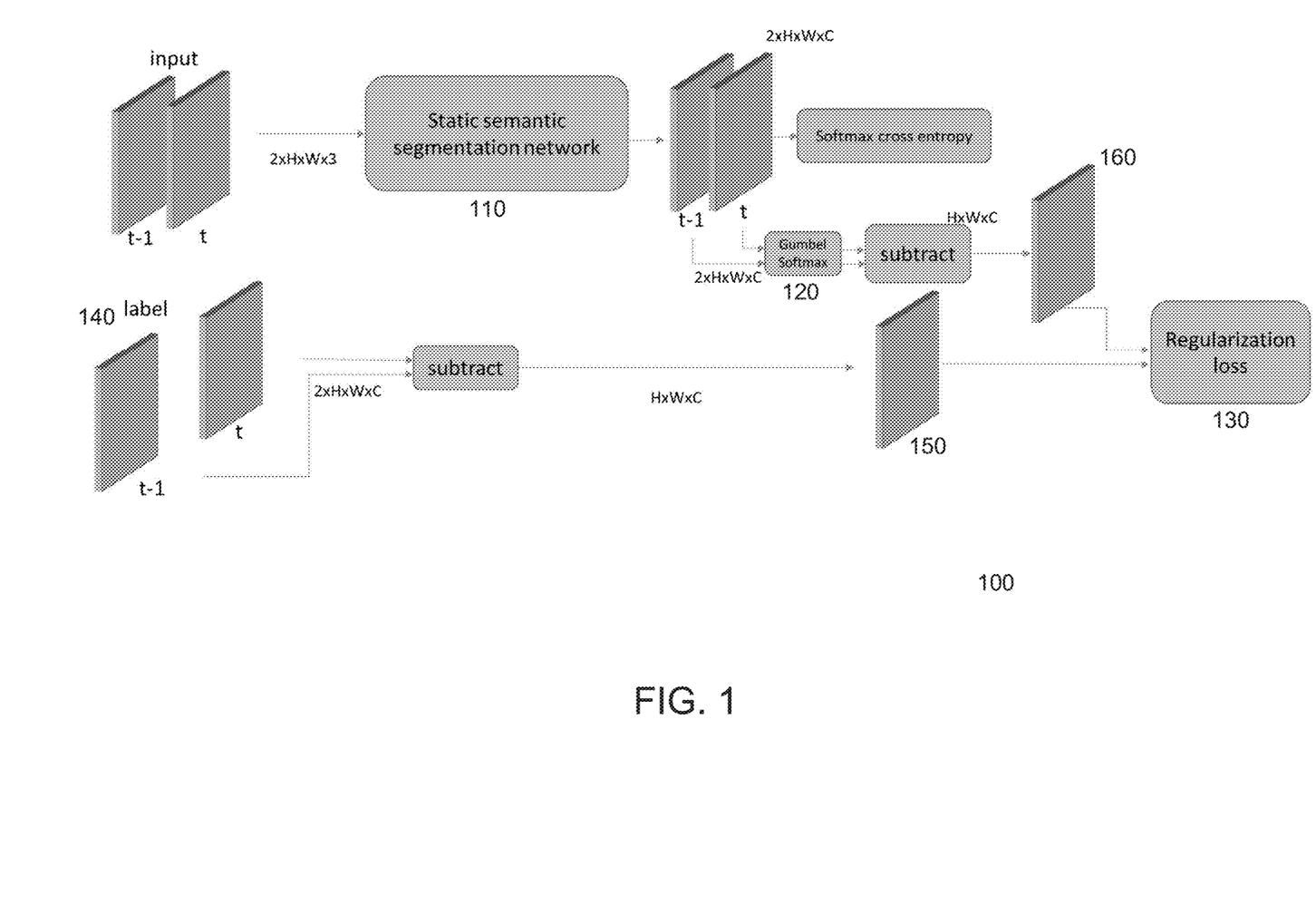
FIG. 1 illustrates a temporal-semantic boundary loss (T-SBL) 100 for static segmentation networks, according to an embodiment.

FIG. 1 illustrates T-SBL 100 for a static semantic segmentation network 110, according to an embodiment.

In Equation (1) below, let $S_t$, $S_{t-1} \in R^{H,W,C}$ represent the Gumbel Softmax 120 output of the frames t and t−1, and $g_t$, $g_{t-1} \in R^{H,W,C}$ denote the ground truth labels at frames t and t−1. $Pred_{diff}$ is the difference between $S_t$ and $S_{t-1}$, and $gt_{diff}$ is the difference between $g_t$ and $g_{t-1}$. E is the L1 error between the predicted difference and ground truth difference. The T-SBL (i.e., regularization loss 130) is computed over the pixels selected by two masks $Pred_{mask}$ and $gt_{mask}$ which enable the pixels with large temporal changes to be selected.

$$S_t, S_{t-1}, Pred_{diff}, gt_{diff}, E, Pred_{mask}, gt_{mask} \in \mathcal{R}^{H,W,C} \quad (1)$$

$$Pred_{diff} = S_t - S_{t-1}$$

$$gt_{diff} = g_t - g_{t-1}$$

$$E = |Pred_{diff} - gt_{diff}|$$

$$Pred_{mask} = \begin{cases} 1, & |Pred_{diff}| \geq 0.1 \\ 0, & \text{Otherwise} \end{cases}$$

$$gt_{mask} = \begin{cases} 1, & |gt_{diff}| > 0 \\ 0, & \text{Otherwise} \end{cases}$$

$$Loss_{T-SBL} = 0.5 * \frac{\sum_c^C \sum_i^H \sum_j^W Pred_{mask}(i,j,c) * E(i,j,c)}{\sum_c^C \sum_i^H \sum_j^W Pred_{mask}(i,j,c)} + 0.5$$

$$* \frac{\sum_c^C \sum_i^H \sum_j^W gt_{mask}(i,j,c) * E(i,j,c)}{\sum_c^C \sum_i^H \sum_j^W gt_{mask}(i,j,c)}$$

Softmax cross entropy 170 is also performed on the output of the two frames t−1 and t from the network 110. The total loss (i.e., regularization loss 130 plus Softmax cross entropy 170) is shown in Equation (2) below.

$$L_{total} = -\sum_{\tau=t-1}^{t} \sum_j^H \sum_i^W \sum_{c=0}^{C} g_{\tau,i,j,c} \log y_{\tau,i,j,c} + \lambda_{T-SBL} Loss_{T-SBL} \quad (2)$$

The method of FIG. 1, therefore, improves temporal consistency without increasing the computational cost at the inference stage by eliminating the TC loss which requires higher computation cost at the inference stage due to its reliance on optical flow and warping.

Specifically, in the T-SBL of FIG. 1, an L1 loss is computed between the temporal semantic boundary detected from the ground truth labels and the predicted labels. A temporal semantic boundary is defined as the difference between two labels (predictions) from two consecutive frames t−1 and t. The disclosed loss function requires the network to generate the same temporal semantic boundary as the temporal semantic boundary in the ground truth label. The method in FIG. 1 does not require optical flow but is operable with optical flow, if needed.

That is, in FIG. 1, the input data t−1 and t is video data of different frames. Video data herein refers to the image frames generated by an imaging sensor and includes a series of frames of still images. Each still image is a recording of the content within one moment. All the images together record the continuous motion of the content present in the video. A still image refers to an image or photograph which contains static content when it is desired to differentiate an image frame from a video and a standalone image. That is, the standalone image does not include a previous frame or a next frame, and is referred to as the still image. The image from a video is referred to as an image frame or a frame, to be contrasted with the still images since these video images are temporally correlated, unlike still images.

Applying the static semantic segmentation network 110 to a video frame has caused the challenge of the network generating a different prediction for two consecutive frames, which has resulted in flickering video production. For example, the method disclosed herein predicts the pixels of a human face. On the boundary of the face, flickering tends to occur around the boundary of the face, which may be in one frame while background may be in a previous or a subsequent frame. The disclosed method provides a temporally consistent output of the video by producing a smooth output in each frame by negating the requirement of an optical flow estimation or motion estimation to estimate the change in the content between the consecutive frames. The optical flow has been used to estimate the motion, which is compensated to warp the previous frame to the counter frame and a loss is calculated to force the model to generate a similar prediction for consecutive frames. In the method of FIG. 1, however, it is unnecessary to use optical flow since this utilization tends to be inaccurate and introduces errors. In FIG. 1, a loss 130 is calculated to train the semantic segmentation model. When there is error in the loss 130, the semantic segmentation model can be misled into believing that a suboptimal determination is accurate. In FIG. 1, the optical flow estimation is eliminated to preclude the additional loss from being calculated in the regularization loss 130 determination.

More specifically, the ground truth label 140, which is estimated by an annotator, is computed on the two frames t−1 and t and the label of the two frames is subtracted, resulting in a temporal semantic boundary 150. That is, when an object moves in the two frames, there is a boundary (i.e., the temporal semantic boundary) around the original boundary of the moved object. When the object does not move in the two frames, there is no such temporal semantic boundary. A temporal semantic boundary map 150 is generated and the same predictions are performed for the two frames t−1 and t. A predicted temporal semantic boundary map 160 is computed and the two boundary maps 150 and 160 are forced to be identical in the regularization loss 130, i.e., the predicted temporal semantic boundary map 160 is forced to be identical to the boundary map 150 via a network training process. The boundary map 150 remains unchanged since it is the ground truth temporal semantic boundary map. In this manner, no error is introduced in the loss computation, resulting in a model that is not misled into using suboptimal factors in the computation.

Moreover, a motivation for the disclosed T-SBL to use less computation than in the prior art recurrent network-based methods is based on the method being run on a mobile device, which is resource-limited. Therefore, the mobile device consumes less memory than the method of the prior art when running the methods as disclosed herein. Less memory will also be consumed by application of the disclosed method to a cloud environment, for example, since the optical flow of the prior art is not used for training in the network. To wit, the conventional recurrent network based methods (e.g., GRFP) add a recurrent module to the static semantic segmentation network. This recurrent module is needed in the training and inference stages in the prior art for temporal consistency purposes, as described below in reference to FIG. 5. In contrast, the disclosed T-SBL adds T-SBL at the training stage but removes this T-SBL at the inference stage, thereby simplifying computation yet maintaining improved the temporal consistency.

Figure 2:
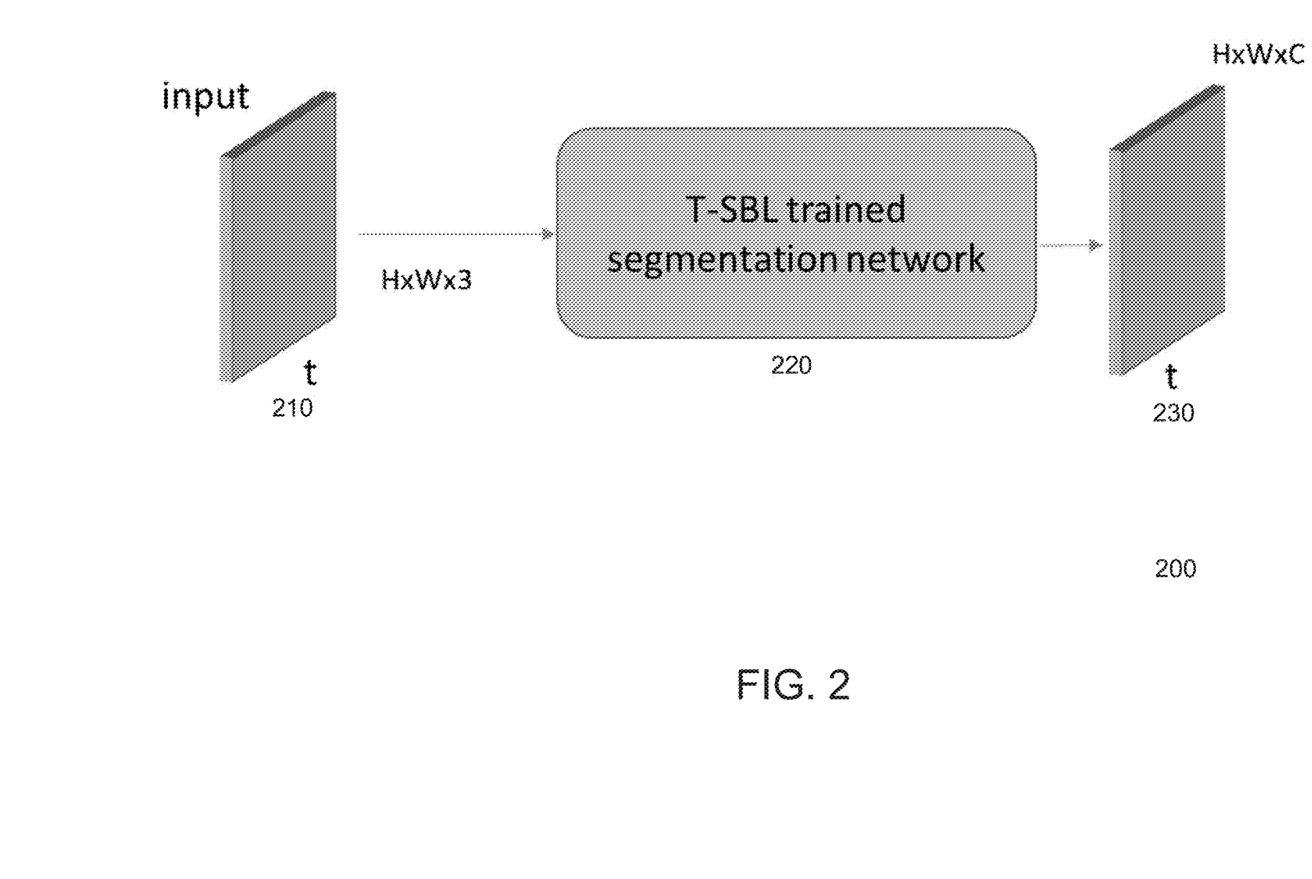
FIG. 2 illustrates the inference architecture 200 of the T-SBL of FIG. 1.

FIG. 2 illustrates the inference architecture 200 of FIG. 1, according to an embodiment. That is, FIG. 2 illustrates the embodiment of FIG. 1 without the T-SBL. In FIG. 2, a T-SBL trained segmentation network 220 receives an input H×W×3 210 and produces an output H×W×C 230. The T-SBL trained semantic segmentation network 220 is the trained version of the static semantic segmentation network 110 illustrated in FIG. 1. H×W×3 210 refers to the shape of the input image or a frame from a video, H refers to the height of the image, W refers to the width of the image, and 3 refers to the channel of the image. It is noted that H×W×3 210 may be replaced with H×W×4 or H×W×5 depending on the modality of the video. H×W×C 230 refers to the output of the network, where H and W indicate height and width, respectively, and C indicates the number of predefined classes.

T-SBL can also be used to train a video semantic segmentation network with at least one temporal fusion module, which is a network component that combines the image information (features) from a plurality of frames. The design of the temporal fusion module can vary but the module generally combines the information from multiple frames of images or image features.

Figure 3:
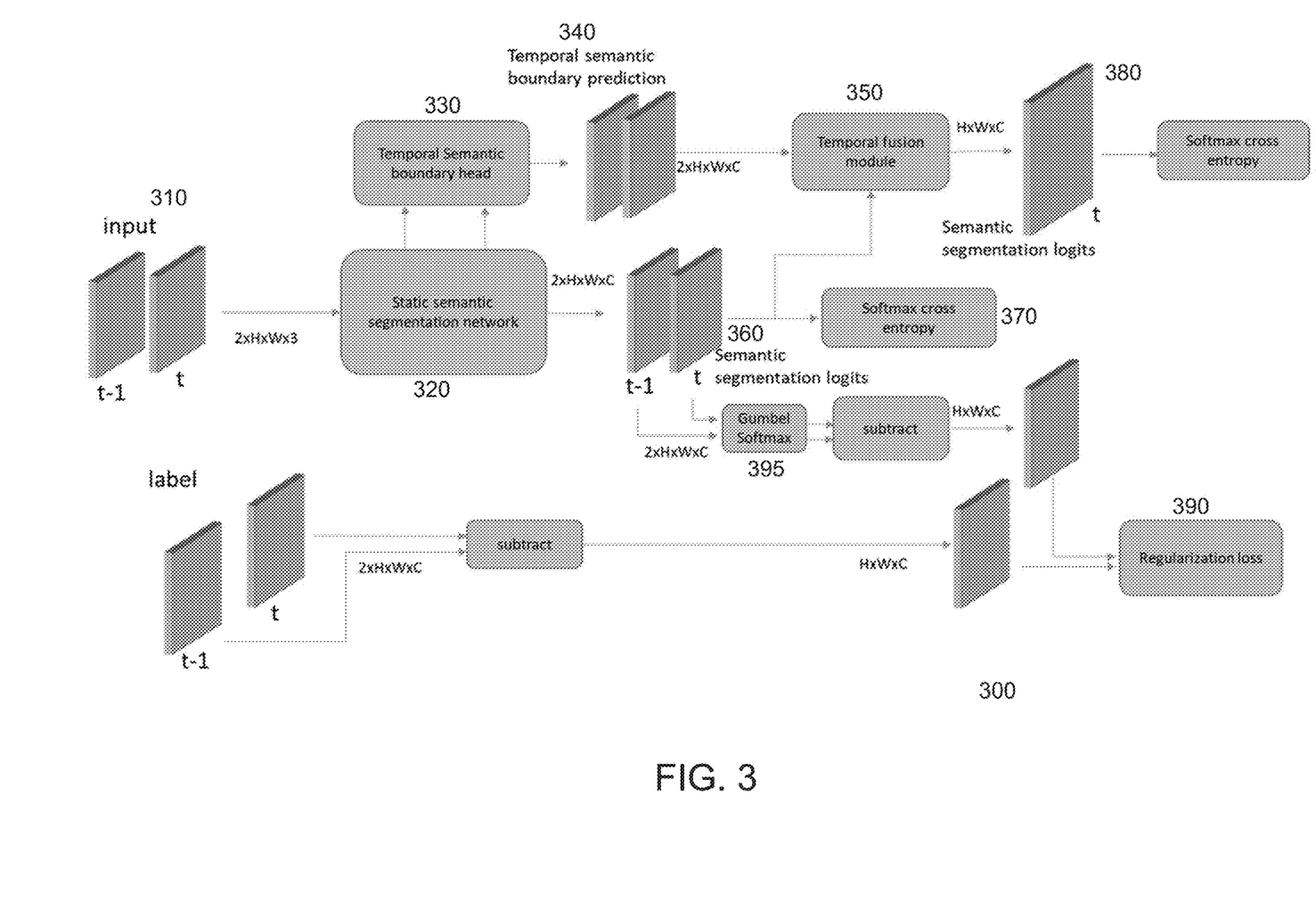
FIG. 3 illustrates the training architecture 300 of T-SBL with temporal semantic boundary prediction based temporal fusion, according to an embodiment.

FIG. 3 illustrates the training architecture 300 of T-SBL with temporal semantic boundary prediction based temporal fusion, according to an embodiment. In FIG. 3, two input frames t–1 and t 310 are received by a static semantic segmentation network 320 which processes the frames 310 and produces an output that is sent to a temporal semantic boundary head 330 that provides a temporal semantic boundary prediction 340 of the processed frames. In particular, the temporal semantic boundary head 330 is a network component that predicts the temporal semantic boundary between each pair of consecutive frames. The output of the temporal semantic boundary head 330 has the shape of 2×H×W×C. The temporal boundary is represented by at least 2 frames. Thus, the output has shape of 2×H×W×C.

Furthermore, the output 2×H×W×C is received by a temporal fusion module 350, along with semantic segmentation logits 360 of the processed frames. That is, 2×H×W×C indicates the shape of a tensor. A two dimensional (2D) matrix usually has shape of H×W. H indicates the number of rows, and W indicates the number of columns. In deep learning and machine learning, there is a higher dimensional matrix that takes the shape of 2×H×W×C. This is similar to two three dimensional (3D) matrices (H×W×C) that are combined and take the shape of 2×H×W×C where H indicates the number of rows, W indicates the number of columns, C indicates the number of channels (depth), and 2 indicates number of frames.

Softmax cross entropy 370 is also performed on the semantic segmentation logits 360 of the two frames t–1 and t as well as the fused frame t 380 output from the temporal fusion module 350. A regularization loss 390 is generated based on an input from a label of the two frames t and t–1 and the Gumbel Softmax 395 output of the two frames t and t–1. In particular, softmax cross entropy 370 is a standard terminology in machine learning and deep learning and applies to semantic segmentation and image classification networks or other similar machine learning algorithms.

Thus, the training architecture 300 of T-SBL in FIG. 3 may be used to train a video semantic segmentation network with a temporal fusion module 350.

It is noted that a semantic segmentation network is generally designed for single still image semantic segmentation. Herein, the static semantic segmentation network 320 indicates capturing of a still image and no temporal information from multiple frames of a video.

Figure 4:
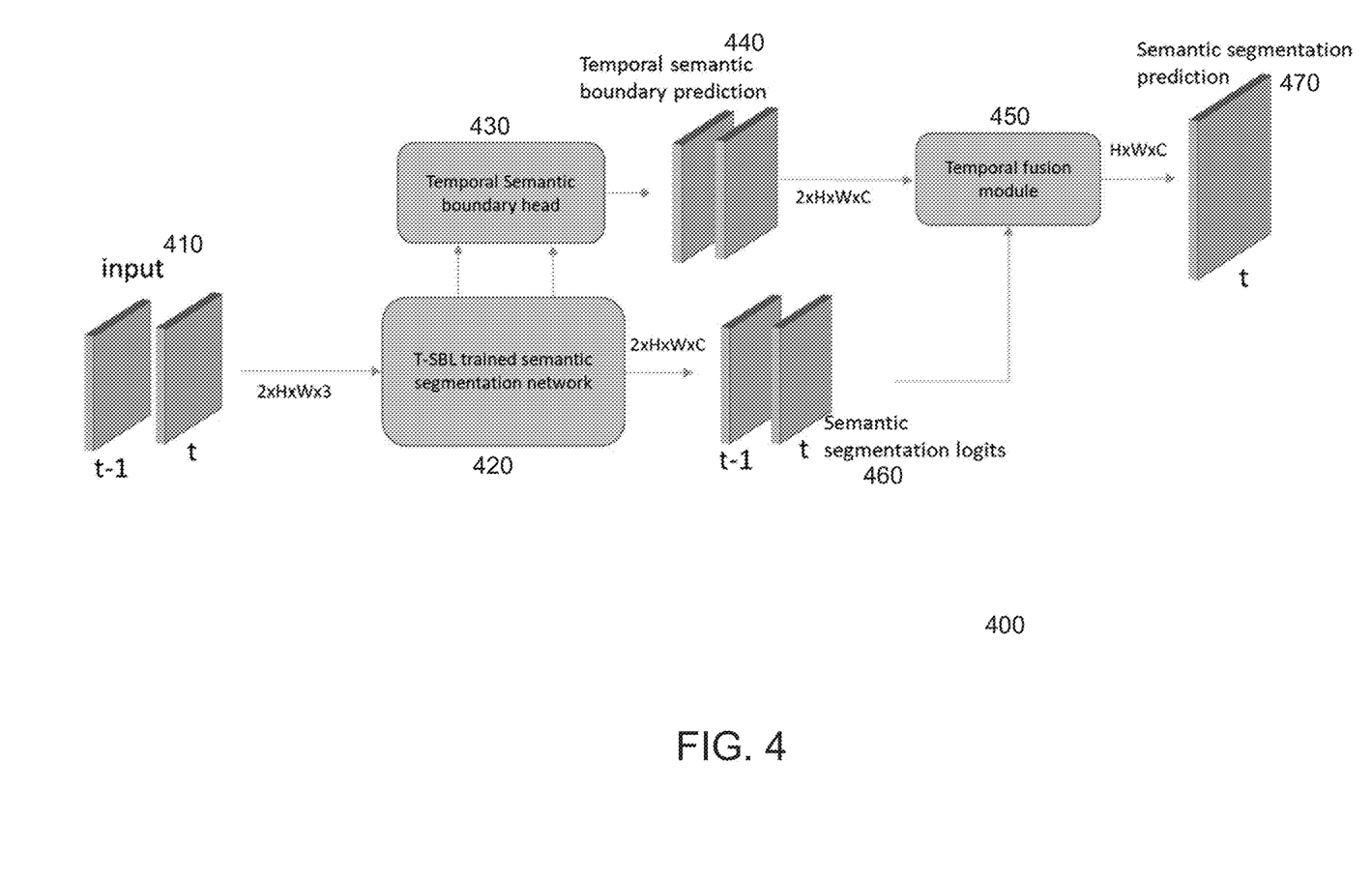
FIG. 4 illustrates the interference architecture 400 of the T-SBL of FIG. 3.

FIG. 4 illustrates the interference architecture 400 of FIG. 3, according to an embodiment. In FIG. 4, the two frames 410 are processed in a similar manner as in the training architecture of FIG. 3, except that the two frames 410 are input into a T-SBL trained semantic segmentation network 420 instead of the static semantic segmentation network 320 in FIG. 3. In other words, 420 and 320 illustrate networks with identical architectures but different parameters as the network 420 in FIG. 4 is derived from the network 320 in FIG. 3 and is trained with the disclosed T-SBL loss.

The output from this network 420 is sent to a temporal semantic boundary head 430, from which a temporal semantic boundary prediction 440 is generated a semantic segmentation prediction 470 is made based on the output of the prediction 440 and semantic segmentation logits 460 that are received and processed by a temporal fusion module 450.

Figure 5:
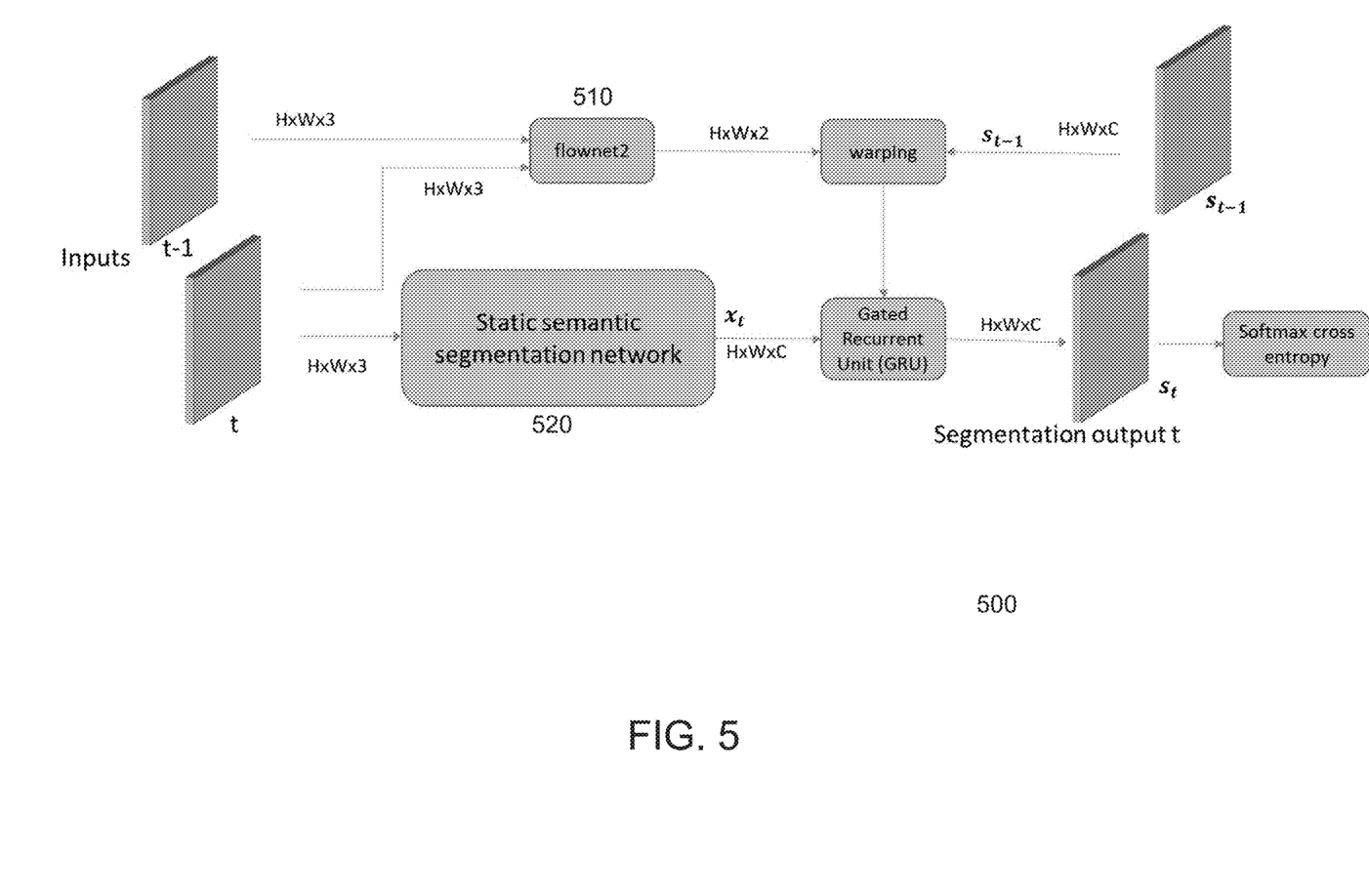
FIG. 5 illustrates a modified gated recurrent flow propagation (GRFP) framework 500, to which the disclosure is applied.

FIG. 5 illustrates the modified GRFP framework 500, to which the disclosure is applied. In FIG. 5, to improve the recurrent framework based semantic segmentation networks, a GRFP framework is selected as the baseline framework. The backbone and decoder subnet is replaced with a static semantic segmentation network. That is, the gated recurrent unit (GRU) is a network component generally used in sequential data recognition, such as videos, language and audio and has sequential input and output. Two inputs are made at each step, one being the information from the current step and one being the information from its output at the last step or previous steps. The output tends to be a better prediction of the current step.

In FIG. 5, flownet2 510, which is an optical flow training estimation network, is needed during training. The flownet2 510 network consumes excessive memory resources and thus is a detriment to the overall network. After training, when deployed and in the inference stage, flownet2 510 remains in the system and is run or utilized for the prediction of each frame. There are two networks running in the computational unit, i.e., flownet2 510 and the static semantic segmentation network 520, which consumes excessive computation power and memory.

Figure 6:
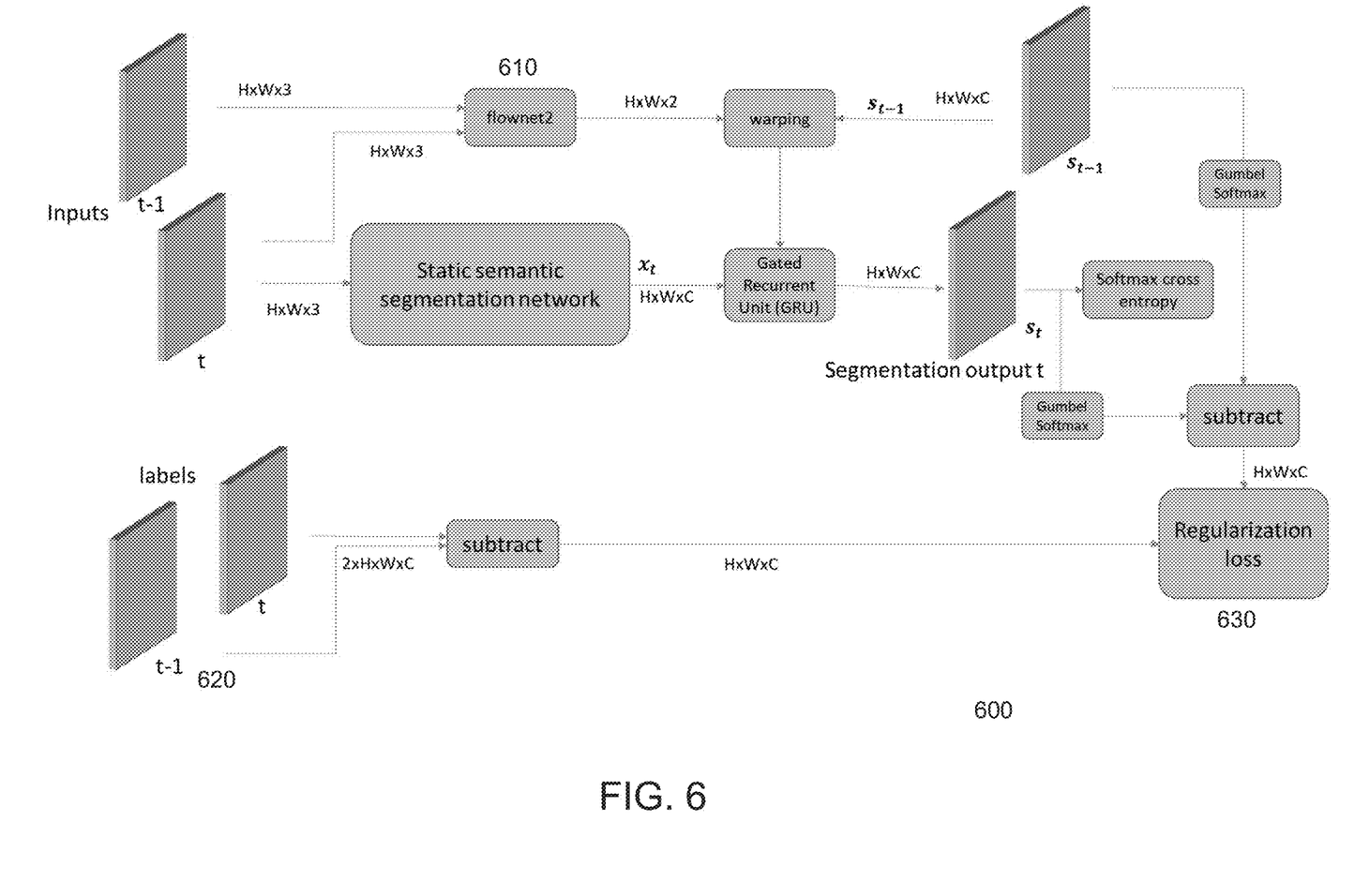
FIG. 6 illustrates a T-SBL plug-in 600 for semantic segmentation networks based on recurrent frameworks, according to an embodiment.

FIG. 6 illustrates a T-SBL plug-in 600 for semantic segmentation networks based on recurrent frameworks, according to an embodiment. In FIG. 6, although flownet2 610 is utilized similar to the prior art embodiment in FIG. 5, the labels of the frames t–1 and t as described above in reference to FIG. 3 are employed and the regularization loss 630 is calculated based on the input of the labels 620 in combination with a Gumbel softmax output of the frames t and t–1. In turn, a more accurate loss determination is made on the end of the regularization loss 630.

Figure 7:
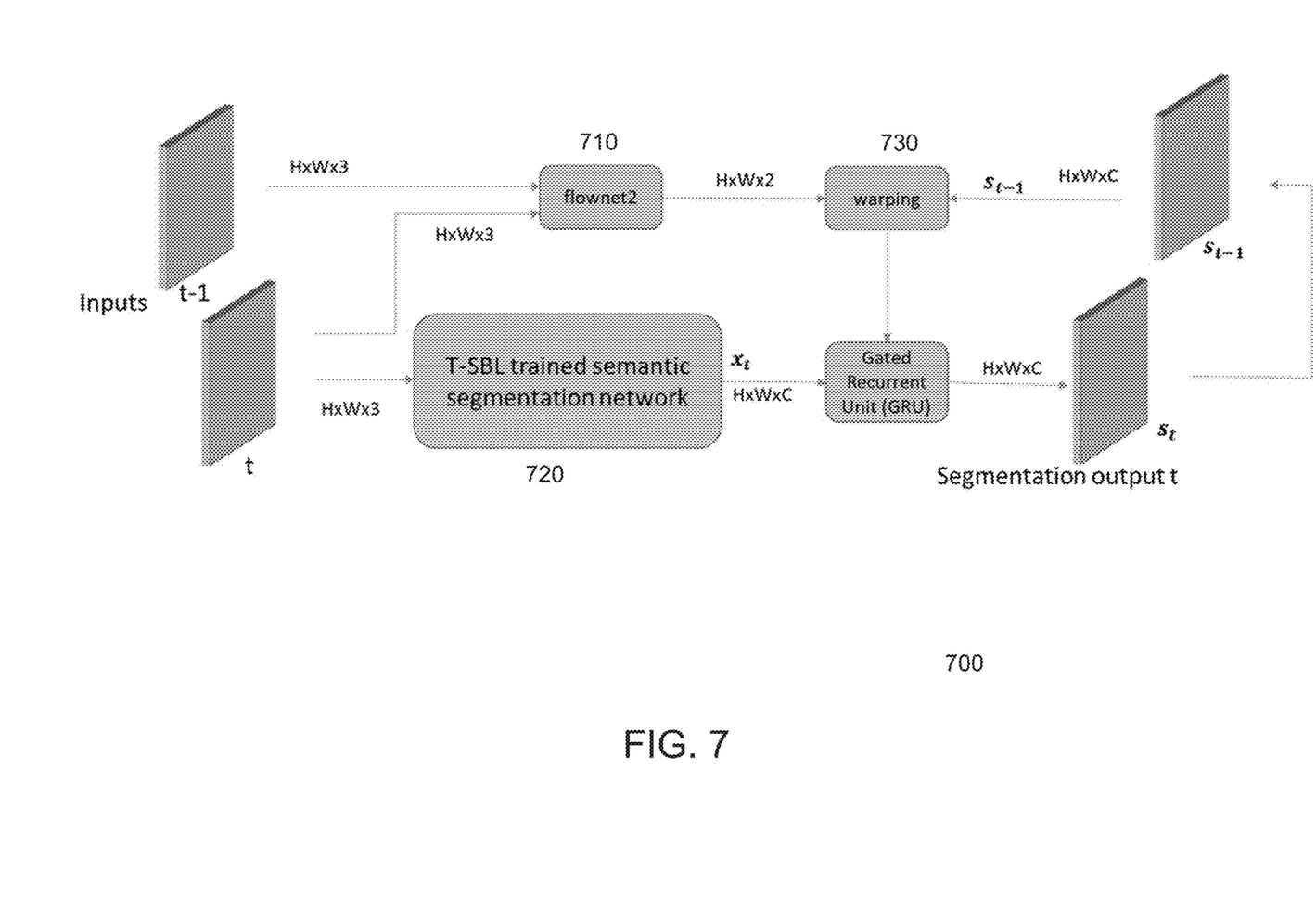
FIG. 7 illustrates an interference architecture 700 for enhanced recurrent framework based semantic segmentation networks, according to an embodiment.

FIG. 7 illustrates the interference architecture 700 for enhanced recurrent framework based semantic segmentation networks, according to an embodiment. FIG. 7 is the inference architecture of FIGS. 5 and 6. The disclosed method does not change inference architecture, and therefore, does not incur a new computation cost.

In FIG. 7, although flownet2 710 is utilized, a T-SBL trained segmentation network 710 receives the input from a frame t and flownet2 710 receives the input from the frame t–1. Warping 730 is calculated for the output of frame t–1 from flownet2 710 and a GRU processes the output from the T-SBL trained semantic segmentation network 720.

TC loss is a plug-in loss for any video semantic segmentation framework, including recurrent network-based frameworks.

Figure 8:
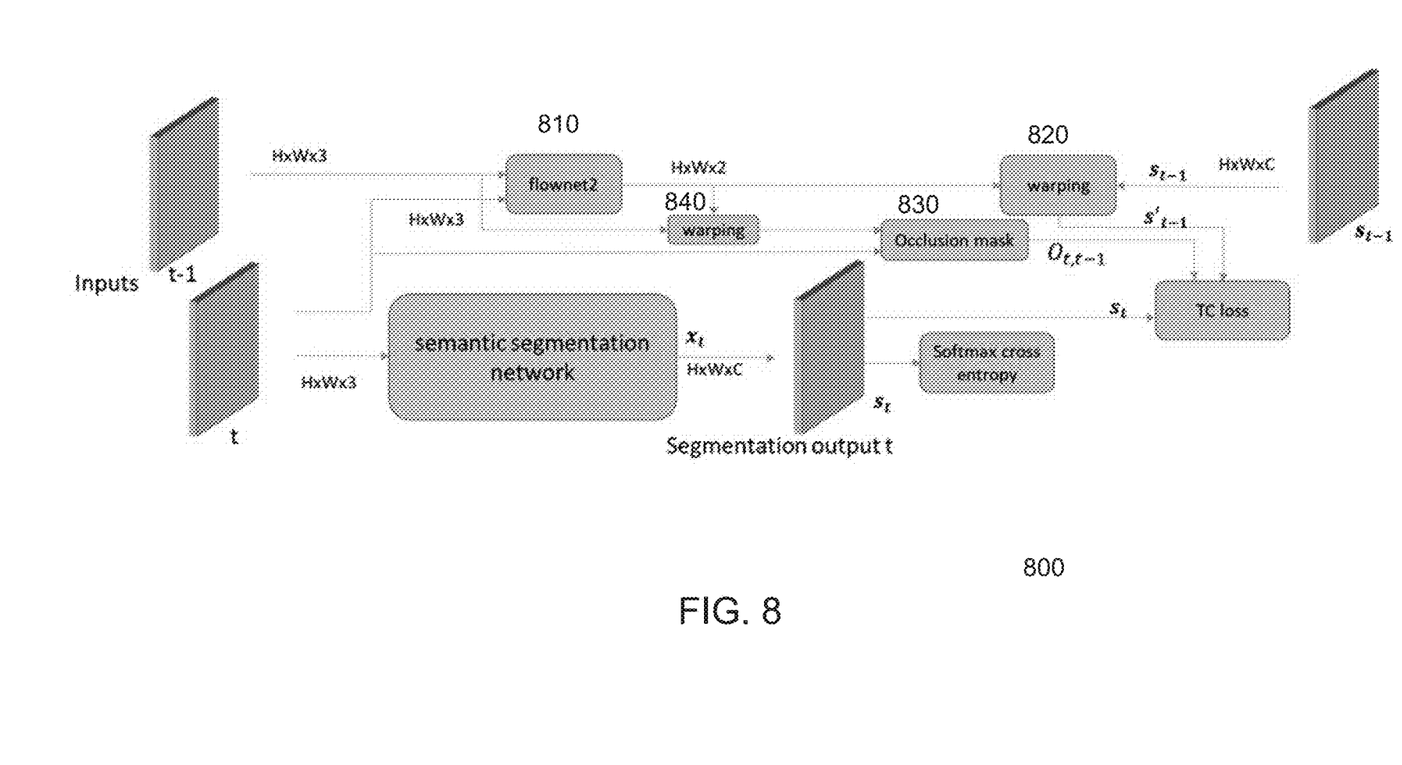
FIG. 8 illustrates a conventional TC loss framework 800, according to the prior art.

FIG. 8 illustrates a general framework of TC loss according to the prior art. FIG. 8 is the training architecture and loss for TC loss in the prior art.

The TC loss is an L2 loss between a warped prediction of a previous frame and a prediction of a current frame. Specifically, $s_{t-1}$ and $s_t$ are the prediction logits of the previous frame and the current frame. $s'_{t-1}$ is the warped 820 version of $s_{t-1}$. $O_{t,t-1} \in R^{H,W}$ denotes the occlusion mask 830 to disregard the errors introduced by the optical flow warping 840. The TC loss is computed as set forth in Equation (3) below.

$$\text{Loss}_{TC} = \sum_{j}^{H} \sum_{i}^{W} \sum_{c}^{C} O_{t,t-1\,i,j} \|s_{t,i,j,c} - s'_{t-1\,i,j,c}\|_2^2 \quad (3)$$

$$O_{t,t-1\,i,j} = \exp\left(-\sum_{c=0}^{2} |I_{t i,j,c} - I'_{t-1\,i,j,c}|\right)$$

In the method of FIG. 8, the optical flow produced by flownet2 810 introduces error in the TC loss calculation. Although the errors are disregarded by the occlusion mask 830, the occlusion mask 830 also disregards the errors that would have been useful for the model to learn temporal consistency. This disadvantage is reflected in the final model obtained from the training process and creates a suboptimal model in the training stage.

Figure 9:
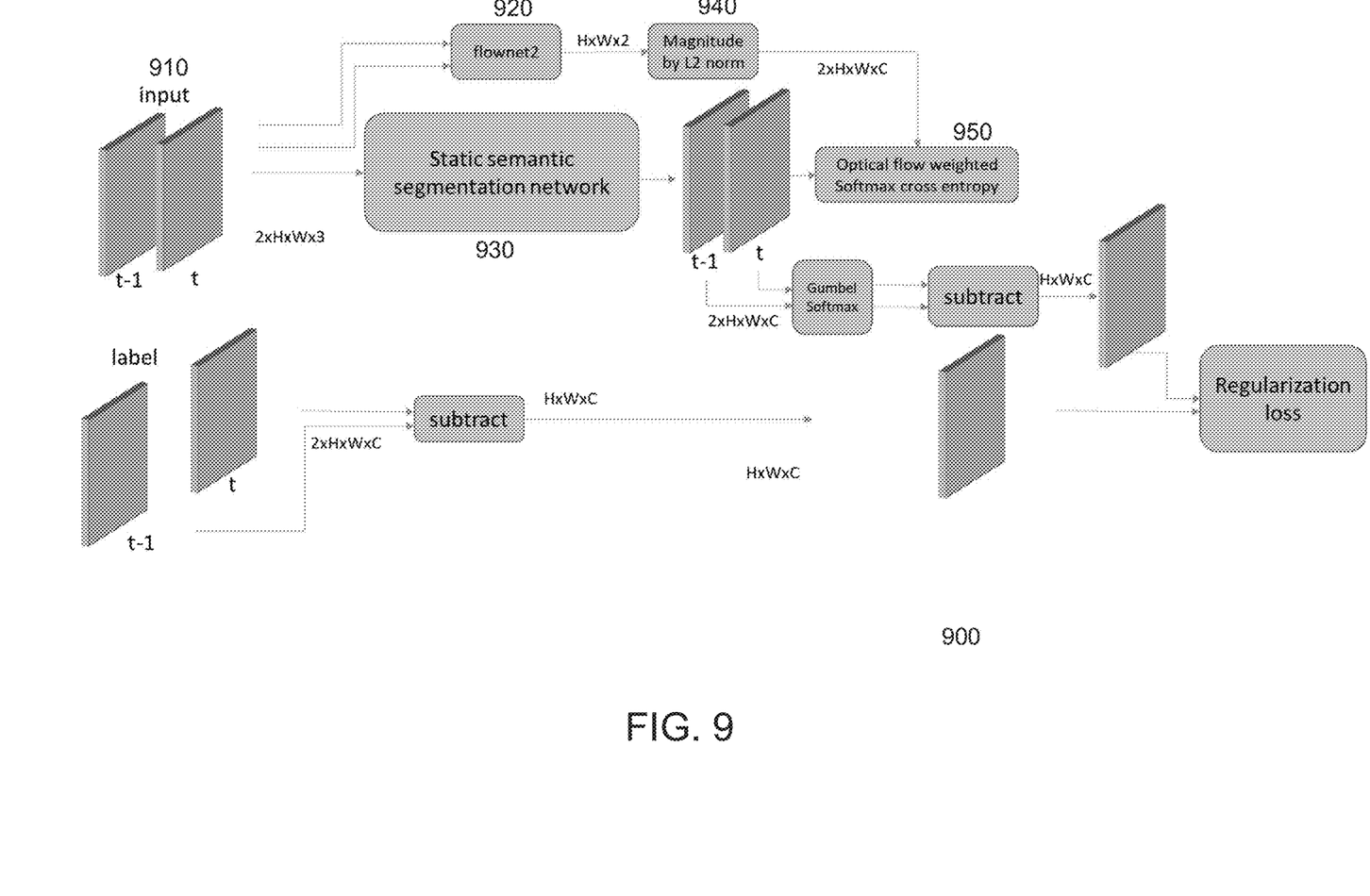
FIG. 9 illustrates a T-SBL 900 with optical flow magnitude weighted softmax cross entropy, according to an embodiment.

FIG. 9 illustrates T-SBL 900 with optical flow magnitude weighted softmax cross entropy, according to an embodiment. The method of FIG. 9 enhances the overall temporal consistency for the moving objects and has the same interference architecture of the embodiment of FIG. 2.

The temporal boundary semantic loss improves the accuracy in the boundary regions. To improve the overall temporal consistency, the classic Softmax cross entropy may be weighted based on motion estimation based on optical flow. FIG. 9 shows an example using flownet2 920 as the optical flow estimation module. An optical flow module is added to the T-SBL training framework. The two consecutive input frames 910 are fed into the optical flow networks, i.e., flownet2 920 and the static semantic segmentation network 930. The motion prediction from the optical flow network is used to compute a pixel-wise displacement map by L2 norm 940. The displacement map is used as a pixel-wise spatial weight in the Softmax cross entropy 950. In this manner, the objects moving faster tend to have larger displacement and, therefore, higher weight and higher penalty from the loss computation.

For video semantic segmentation, in most cases the training videos are partially labels. Usually, the frames are labeled every other few frames. T-SBL requires ground truth labels for consecutive frames. In such a case, only the sparsely annotated frames can be used to compute the T-SBL. This creates large displacement between two consecutive frames that could undermine the T-SBL training. To mitigate such an issue, warping based T-SBL is provided as described below in reference to FIG. 10. With optical flow estimation, the previous frame can be warped to the current frame and then used to compute T-SBL.

Figure 10:
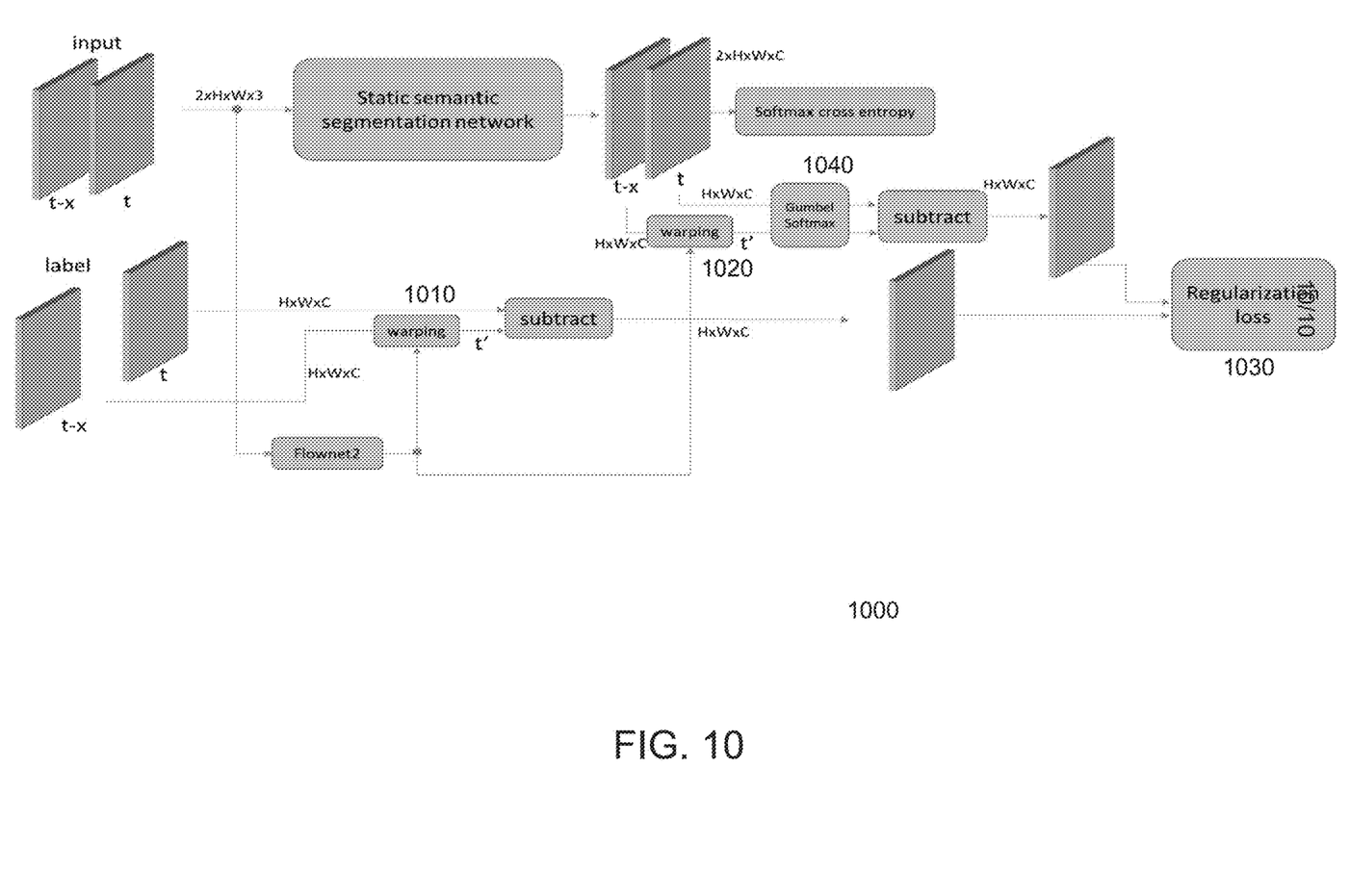
FIG. 10 illustrates a training architecture 1000 for warping based T-SBL, according to an embodiment.

FIG. 10 illustrates a training architecture for warping based T-SBL, according to an embodiment. The inference architecture of the embodiment of FIG. 10 is shown in FIG. 2. As shown in FIG. 10, with optical flow estimation, the previous frame t−1 is warped to the current frame t by the warping operations 1010 and 1020 and is used to compute T-SBL in the regularization loss 1030.

In Equation (4) below, let $I_t$ and $I_{t-x}$ denote the frame at the time t and some previous time t−x, x>1. Let $g_t$ and $g_{t-x}$ denote the ground truth label at for frame t and some previous frame t−x. Let $S_t$ and $S_{t-x}$ denote the predicted segmentation maps processed by Gumbel Softmax 1040. $\text{Pred}_{diff}$ is the difference between $S_t$ and $S_{t-x}$, and $gt_{diff}$ is the difference between $g_t$ and $g_{t-x}$. Let $W_{I_{t-x} \to I_t}(\cdot)$ denote the warping function computed from an optical flow network for mapping $I_{t-x}$ to $I_t$. Let $\text{Pred}_{mask}$ and $gt_{mask}$ denote binary masks computed from $\text{Pred}_{diff}$ and $gt_{diff}$. The warping based T-SBL is computed in Equation (4) below.

$$S_t, S_{t-x}, \text{Pred}_{diff}, gt_{diff}, E, \text{Pred}_{mask}, gt_{mask} \in \mathcal{R}^{H,W,C} \quad (4)$$

$$W_{I_{t-x} \to I_t}(\cdot) = \text{opticalFlow}(I_t, I_{t-x})$$

$$\text{Pred}_{diff} = S_t - W_{I_{t-x} \to I_t}(S_{t-x})$$

$$gt_{diff} = g_t - W_{I_{t-x} \to I_t}(g_{t-x})$$

$$E = |\text{Pred}_{diff} - gt_{diff}|$$

$$\text{Pred}_{mask} = \begin{cases} 1, & |\text{Pred}_{diff}| \geq 0.1 \\ 0, & \text{Otherwise} \end{cases}$$

$$gt_{mask} = \begin{cases} 1, & |gt_{diff}| > 0 \\ 0, & \text{Otherwise} \end{cases}$$

$$\text{Loss}_{T-SBL} = 0.5 * \frac{\sum_c^C \sum_i^H \sum_j^W \text{Pred}_{mask}(i,j,c) * E(i,j,c)}{\sum_c^C \sum_i^H \sum_j^W \text{Pred}_{mask}(i,j,c)} + 0.5$$

$$* \frac{\sum_c^C \sum_i^H \sum_j^W gt_{mask}(i,j,c) * E(i,j,c)}{\sum_c^C \sum_i^H \sum_j^W gt_{mask}(i,j,c)}$$

The total loss is shown in Equation (5) below.

$$L_{total} = -\sum_{\tau=t-1}^{t} \sum_{j}^{H} \sum_{i}^{W} \sum_{c=0}^{C} g_{\tau,i,j,c} \log y_{\tau,i,j,c} + \lambda_{T-SBL} \text{Loss}_{T-SBL} \quad (5)$$

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singularly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus.

Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. A method, comprising:
receiving, in a semantic segmentation network, input data from a plurality of frames;
computing a ground truth label for the plurality of frames;
generating a ground truth temporal semantic boundary map by computing a difference between from the ground truth labels of two consecutive frames of the plurality of frames;
generating a predicted temporal semantic boundary map by computing, for each pixel location, a difference between a semantic segmentation prediction at that pixel location in a first frame of the two consecutive frames and a semantic segmentation prediction at a corresponding pixel location in a second frame of the two consecutive frames, the predictions being generated by the semantic segmentation network based on the input data; and
determining a loss based on the ground truth temporal semantic boundary map and the predicted temporal semantic boundary map.

2. The method of claim 1, further comprising:
minimizing the determined loss to cause the ground truth temporal semantic boundary map and the predicted temporal semantic boundary map to be identical.

3. The method of claim 2, further comprising:
training a semantic segmentation model based on the determined loss.

4. The method of claim 1,
wherein the input data is image frames obtained from video data of the plurality of frames.

5. The method of claim 4,
wherein the output of the input data is generated by subtracting a gumbel softmax output from the plurality of frames.

6. The method of claim 1,
wherein the input data is unprocessed by optical flow or motion estimation techniques.

7. The method of claim 1,
wherein at least one of generating the ground truth temporal semantic boundary map and generating the predicted temporal semantic boundary map includes performing optical flow or motion estimation.

8. The method of claim 1,
wherein an identical prediction process is performed for each of the plurality of frames in the predicted semantic segmentation map.

9. The method of claim 1, further comprising:
training a video semantic segmentation network with at least one temporal fusion module based on the determined loss.

10. The method of claim 1, further comprising:
performing softmax cross entropy on the output of the input data.

11. A system comprising:
a processor configured to:
receive, in a semantic segmentation network, input data from a plurality of frames;
compute a ground truth label for the plurality of frames;

generate a ground truth temporal semantic boundary map by computing a difference between from the ground truth labels of two consecutive frames of the plurality of frames;

generate a predicted temporal semantic boundary map by computing, for each pixel location, a difference between a semantic segmentation prediction at that pixel location in a first frame of the two consecutive frames and a semantic segmentation prediction at a corresponding pixel location in a second frame of the two consecutive frames, the predictions being generated by the semantic segmentation network based on the input data; and determine a loss based on the ground truth temporal semantic boundary map and the predicted temporal semantic boundary map.

12. The system of claim 11,
wherein the processor is further configured to minimize the determined loss to cause the ground truth temporal semantic boundary map and the predicted temporal semantic boundary map to be identical.

13. The system of claim 12,
wherein the processor is further configured to train a semantic segmentation model based on the determined loss.

14. The system of claim 11,
wherein the input data is image frames obtained from video data of the plurality of frames.

15. The system of claim 14,
wherein the output of the input data is generated by subtracting a gumbel softmax output from the plurality of frames.

16. The system of claim 11,
wherein the input data is unprocessed by optical flow or motion estimation techniques.

17. The system of claim 11,
wherein at least one of generating the ground truth temporal semantic boundary map and generating the predicted temporal semantic boundary map includes performing optical flow or motion estimation.

18. The system of claim 11,
wherein an identical prediction process is performed for each of the plurality of frames in the predicted semantic segmentation map.

19. The system of claim 11,
wherein the processor is further configured to train a video semantic segmentation network with at least one temporal fusion module based on the determined loss.

* * * * *